United States Patent
Cohen et al.

(10) Patent No.: US 10,015,205 B1
(45) Date of Patent: Jul. 3, 2018

(54) TECHNIQUES FOR TRAFFIC CAPTURE AND RECONSTRUCTION

(71) Applicant: Adallom, Ltd., Tel Aviv (IL)

(72) Inventors: Aviram Cohen, Tel Aviv (IL); Ami Luttwak, Ramat Gan (IL); Roy Reznik, Tel Aviv (IL); Gregory Vishnepolsky, Rehovot (IL)

(73) Assignee: MICROSOFT ISRAEL RESEARCH AND DEVELOPMENT (2002) LTD., Matam Haifa (IL)

( * ) Notice: Subject to any disclaimer, the term of this patent is extended or adjusted under 35 U.S.C. 154(b) by 378 days.

(21) Appl. No.: 14/804,850

(22) Filed: Jul. 21, 2015

Related U.S. Application Data

(60) Provisional application No. 62/027,884, filed on Jul. 23, 2014.

(51) Int. Cl.
*H04L 29/06* (2006.01)
*H04L 29/08* (2006.01)

(52) U.S. Cl.
CPC .......... *H04L 65/1066* (2013.01); *H04L 67/02* (2013.01); *H04L 67/10* (2013.01)

(58) Field of Classification Search
CPC .................................................. H04L 65/1066
See application file for complete search history.

(56) References Cited

U.S. PATENT DOCUMENTS

| | | | |
|---|---|---|---|
| 6,397,246 B1 | 5/2002 | Wolfe | |
| 7,627,693 B2 * | 12/2009 | Pandya | H04L 29/06 709/212 |
| 7,657,937 B1 * | 2/2010 | Kumar | H04L 63/1416 726/23 |
| 8,365,271 B2 | 1/2013 | Blum et al. | |
| 8,578,491 B2 * | 11/2013 | McNamee | H04L 63/1408 709/223 |
| 2004/0017916 A1 * | 1/2004 | Staddon | H04L 9/0833 380/277 |

(Continued)

OTHER PUBLICATIONS

Sekar, Vyas, et al. "The middlebox manifesto: enabling innovation in middlebox deployment." Proceedings of the 10th ACM Workshop on Hot Topics in Networks. ACM, 2011.*

(Continued)

*Primary Examiner* — Jimmy H Tran
(74) *Attorney, Agent, or Firm* — M&B IP Analysts, LLC.

(57) ABSTRACT

Techniques for reconstructing application-layer traffic flowing between client devices and a cloud computing platform are provided. In an embodiment, the method allows for non-intrusive reconstructing application-layer traffic including requests and responses even in cases including packet drops, re-transmitted packets, and jittered packets. The method includes saving received packets into a zero-copy queue and analyzing the packets saved in the zero-copy memory to identify their respective sessions. Then, each identified session is reconstructed into a session window having a configurable size. In an embodiment, each reconstructed session includes application-layer requests and responses; The method further includes for, each identified session, matching each application-layer request to a corresponding application-layer response based on a matching identifier and time-interval threshold.

36 Claims, 6 Drawing Sheets

(56) References Cited

U.S. PATENT DOCUMENTS

| | | | |
|---|---|---|---|
| 2004/0122888 A1* | 6/2004 | Carmichael | H04L 12/2801 709/200 |
| 2005/0091383 A1* | 4/2005 | Bender | H04L 67/1097 709/228 |
| 2008/0198787 A1* | 8/2008 | Nguyen | H04L 1/0084 370/315 |
| 2009/0262741 A1* | 10/2009 | Jungck | H04L 29/12066 370/392 |
| 2010/0095367 A1* | 4/2010 | Narayanaswamy | H04L 63/0245 726/12 |
| 2010/0103837 A1* | 4/2010 | Jungck | H04L 29/12066 370/252 |
| 2010/0146260 A1 | 6/2010 | Levow et al. | |
| 2010/0154059 A1* | 6/2010 | McNamee | H04L 43/00 726/23 |
| 2011/0176556 A1* | 7/2011 | Guo | H04L 1/0041 370/474 |
| 2012/0023160 A1 | 1/2012 | Marmor | |
| 2014/0053239 A1* | 2/2014 | Narayanaswamy | H04L 63/0245 726/1 |
| 2016/0105469 A1* | 4/2016 | Galloway | H04L 69/16 709/231 |

OTHER PUBLICATIONS

Huysegems, Raf, et al. "Session reconstruction for HTTP adaptive streaming: Laying the foundation for network-based QoE monitoring." Proceedings of the 2012 IEEE 20th International Workshop on Quality of Service. IEEE Press, 2012.*

Dharmapurikar, Sarang, and Vern Paxson. "Robust TCP Stream Reassembly in the Presence of Adversaries." USENIX Security Symposium. 2005.*

* cited by examiner

TECHNIQUES FOR TRAFFIC CAPTURE AND RECONSTRUCTION

CROSS-REFERENCE TO RELATED APPLICATIONS

This application claims the benefit of U.S. Provisional Application No. 62/027,884 filed on Jul. 23, 2014, the contents of which are hereby incorporated by reference.

TECHNICAL FIELD

The present disclosure relates generally to transport protocol reconstruction, and more specifically, to a method for HTTP reconstruction for non-intrusive capturing and analysis of packets on a high-speed network.

BACKGROUND

With the advent of the Internet, modern computer applications not only operate on isolated systems, but also communicate with each other on data communication networks. These network applications communicate with each other by sending and receiving packets to and from each other on the networks. Network applications capture, process, and analyze the packets on the network in order to communicate with each other.

For analysis of the communication between the network applications, a specialized non-intrusive packet collection system can be deployed. For successful analysis, such a system should be able to capture, process, and analyze the packets received from other network applications in the correct order in which they were sent by the other applications. There are various commercial and open source applications performing packet analysis currently available for network applications.

The success of conventional packet analysis applications depends upon their abilities to non-intrusively capture individual data transmission packets and restore their logical Internet Protocol (IP) flows and HTTP streams. An example of a packet analysis application utilizing non-intrusive packet analysis includes, for example, the open source network intrusion detection system (SNORT). However, none of the conventional packet analysis applications are effective in HTTP reconstruction for non-intrusive capturing and analysis of packets on a high-speed network.

When inspecting a large volume of network traffic in a non-intrusive tap mode, significant challenges to address include packet drops, re-transmitted packets, and jittered packets in the reconstruction of the packet flows.

Typically, packet drops may occur in various places, including (1) at the packet provider of an auditor (in some cases, a switch with port mirroring or a network tap device), (2) at the auditor network card, (3) while processing the tapped packets. These problems are not compensated for by using the TCP reliability mechanism in a passive tap mode. The mechanisms in packet reconstruction in intrusion detection systems (IDS) also do not reconstruct entire sessions, but mostly perform inspection on a single packet or a small number of packets for signature matching.

If the TCP stream is corrupted, the HTTP application layer requests and responses can typically be reconstructed and processed into event logs. However, packet drops in the lower TCP layer may impair the content of the HTTP messages, in their headers, or in both. As a result, the HTTP stream cannot be parsed, and thus cannot be reconstructed.

It would therefore be advantageous to provide a solution that would overcome the deficiencies of the prior art solutions for capture and reconstruction of HTTP traffic.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Some embodiments of the disclosure relate to a method for reconstructing application-layer traffic flowing between a plurality client devices and a cloud computing platform. The method comprises: receiving packets transported between client devices and servers operable in a cloud computing platform; saving the received packets to a zero-copy queue, wherein the zero-copy queue is configured for storing the packets in a shared memory for subsequent processing; analyzing the packets saved in the zero-copy memory to identify their respective at least one session; reconstructing each of the at least one identified session into a session window having a configurable size, wherein a reconstructed session includes requests and responses; and for each of the at least one identified session, matching each request to a corresponding response based on a matching identifier and time-interval threshold.

Some embodiments of the disclosure relate to an appliance for reconstructing application-layer traffic flowing between a plurality client devices and a cloud computing platform. The appliance comprises: a sniffing module configured to receive packets transported between client devices and servers operable in a cloud computing platform, wherein the sniffing module is further configured to save the received packets to a zero-copy queue, wherein the zero-copy queue is configured for storing the packets in a shared memory for subsequent processing; a flow processing module configured to analyze the packets saved in the zero-copy memory to identify their respective at least one session, wherein the flow processing module is further configured to reconstruct each of the at least one identified session into a session window having a configurable size, wherein a reconstructed session includes requests and responses; and a request feeding module configured to match, for each of the identified sessions, each request to a corresponding response based on a matching identifier and time-interval threshold.

Some embodiments of the disclosure also relate to a system for reconstructing application-layer traffic flowing between a plurality client devices and a cloud computing platform. The system comprises: a processor; and a shared memory, the memory containing instructions that, when executed by the processor, configure the system to: receive packets transported between client devices and servers operable in a cloud computing platform; save the received packets to a zero-copy queue, wherein the zero-copy queue is configured for storing the packets in the shared memory for subsequent processing; analyze the packets saved in the zero-copy memory to identify their respective at least one session; reconstruct each of the at least one identified session into a session window having a configurable size, wherein a reconstructed session includes requests and responses; and for each of the identified session, match each request to a corresponding response based on a matching identifier and time-interval threshold.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
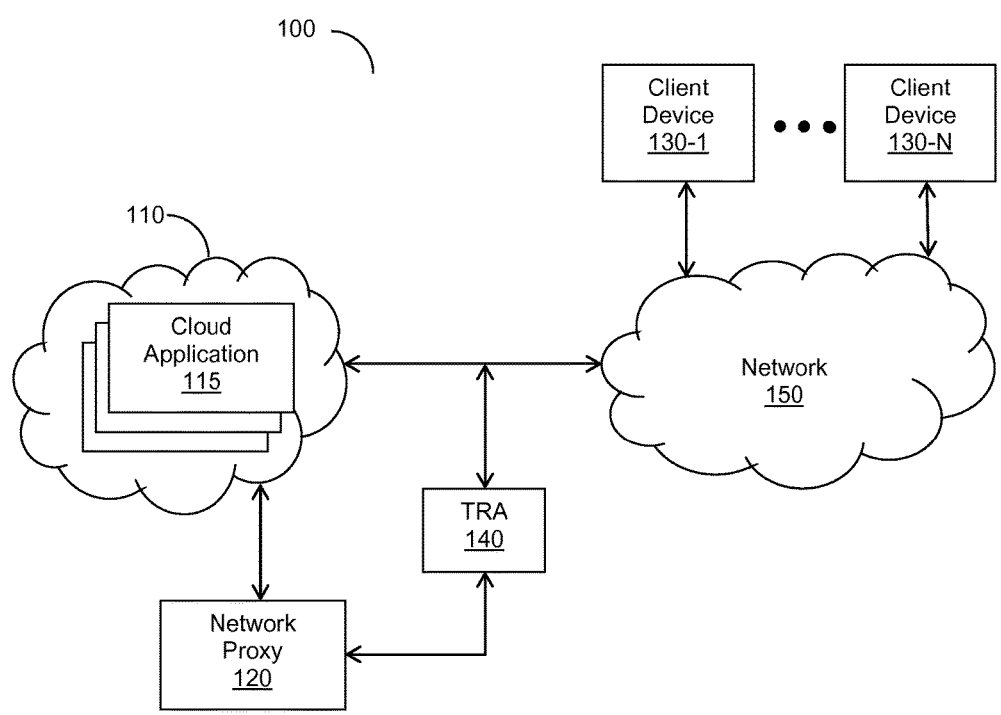
FIG. 1 is a diagram of a networked system utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By a way of example, the various disclosed embodiments can be configured to operate on network traffic between a network-based software as a service (SaaS) provider and a client. As will be discussed in greater detail below, the disclosed embodiments allow for non-intrusive capturing and reconstruction of traffic flows between a SaaS platform and client devices.

FIG. 1 is an exemplary and non-limiting diagram of a networked system 100 utilized to describe the various disclosed embodiments. The networked system 100 includes a cloud computing platform 110 which may be a private cloud, a public cloud, or a hybrid cloud providing computing resources to applications or services executed therein. In an embodiment, the cloud computing platform 110 may be of a SaaS platform.

Organizations and businesses that develop, provide, or otherwise maintain cloud based applications have become accustomed to relying on these services and implementing various types of environments from complex websites to applications and services provided as SaaS delivery models. Such services and applications are collectively referred to as "cloud applications 115".

Cloud applications 115 are typically accessed by users using a client device via a web browser. Cloud applications 115 include, among others, e-commerce applications, social media applications, enterprise applications, gaming applications, media sharing applications, storage applications, software development applications, and so on. Many individual users, businesses, and enterprises turn to cloud applications in lieu of "traditional" software applications that are locally installed and managed. For example, an enterprise can use Office® 365 online services for email accounts, rather than having an Exchange® Server maintained by the enterprise.

The networked system 100 further includes a managed network proxy 120, client devices 130-1 and 130-N, and a traffic reconstruction appliance (TRA) 140 that are communicatively connected to a network 150. The network 150 may be, for example, a wide area network (WAN), a local area network (LAN), the Internet, and the like. Each of the client devices 130 may include, for example, a personal computer, a laptop, a tablet computer, a smartphone, a wearable computing device, or any other computing device. The client devices 130 are configured to access the one or more cloud applications 115 executed in the cloud computing platform 110. In an embodiment, requests and responses between the client devices 130 and servers (not shown) executing the cloud applications 115 are transported over HTTP/1.1 protocol. One of the characteristics of the HTTP/1.1 protocol is to allow multiple requests on a single TCP session. The traffic between client devices 130 and the cloud computing platform 110 is at a high volume, e.g., over 10 Gbps.

In an embodiment, the managed network proxy 120 is configured to receive traffic captured and reconstructed by the TRA 140. The managed network proxy 120 is configured to secure any or all traffic and activities in a cloud computing platform 110. Specifically, the managed network proxy 120 can be used to intercept, monitor, modify, and forward network communications traffic between client devices 130 and the cloud computing platform 110.

The managed network proxy 120 service can be configured to detect and mitigate network threats against the cloud applications 115 and/or the infrastructure of the cloud computing platform 110. As non-limiting examples, the managed network proxy 120 can be configured to notify of suspicious network traffic and behavior, block threats, perform application control, URL filtering, and malware protection on the network traffic, visibility to application layer parameters (e.g., list of users, devices, locations, etc.), generate profiles of users using the cloud applications 115, provide alerts on specific or predefined events, generate audit logs, and so on. The architecture and operation the managed network proxy 120 is discussed in U.S. patent application Ser. No. 14/539,980 assigned to the common assignee, and incorporated herein by reference.

The various disclosed embodiments for capturing and reconstruction of traffic are performed by the TRA 140. The traffic reconstruction can be used when the receiver is not the endpoint (traffic is being tapped/copied) or can alternatively be used when the receiver is the endpoint, particularly when the endpoint is not able to request retransmission of packets. The modes described herein can be used for an arbitrarily large number of concurrent sessions and high volume of traffic. In an embodiment, the TRA 140 is configured to perform reconstruction of HTTP traffic transported using the HTTP/1.1 protocol. As noted above, because the HTTP/1.1 protocol allows multiple requests on a single TCP session, the TRA 140 is configured to recover from packet drops in one request in such a way that following and/or previous requests in the same session are not impacted. To this end, the TRA 140 is configured to match a request with the appropriate response, while dropping any defective requests and proceeding to the next pair.

Specifically, according to some embodiments, the TRA 140 is configured to receive packets in a session according to a network protocol (e.g., TCP/IP) and provide the received packets to a packet processor (not shown in FIG. 1) using a zero-copy queue. In an embodiment, the queue is configured to store the packets in the same physical memory location for subsequent processing. Then, the TRA 140 is configured to process the packets by storing the packets into queues based on the IP-port tuple of the session and by the sequence number of the packets and storing the queues in directories in a file system. The final step in the reconstruction of the traffic as performed by the TRA 140 includes matching a response to a request based on a session identifier. In another embodiment, the response is matched based on a corresponding request. The operation of the TRA 140 is described in greater detail with respect to FIG. 4.

The TRA 140 is configured to perform non-intrusive and intrusive traffic reconstruction. The former case is a "tap mode" and the latter case is a "proxy mode". Exemplary and non-limiting deployment of the TRA 140 operating in the tap mode and proxy mode are illustrated in FIGS. 2 and 3 respectively.

Figure 2:
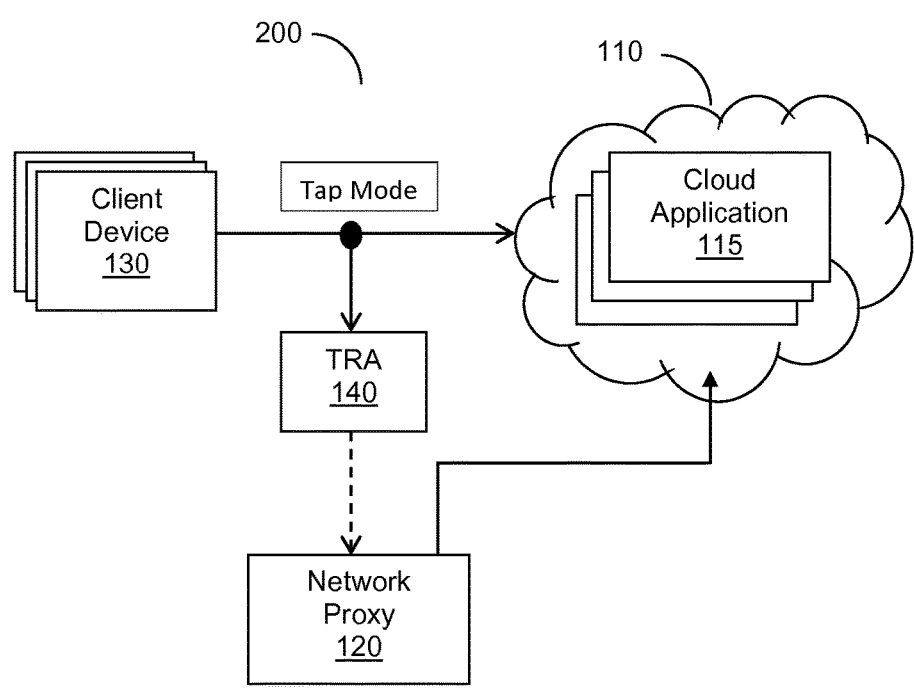
FIG. 2 is a diagram illustrating the deployment of the TRA in a tap mode according to an embodiment.

FIG. 2 is a diagram illustrating a deployment of the TRA 140 in a tap mode. In this mode of operation, the cloud computing platform 110 is the receiver of the requests from the client devices 130. The TRA 140 is configured to tap into the requests sent from the client devices 130 to the cloud computing platform 110 and reconstruct the traffic (by matching corresponding requests) without modifying the requests or the responses. Thus, the deployment of the TRA 140 is inline where the traffic is passively captured and reconstructed. In this embodiment, the reconstructed traffic is sent to the managed network proxy 120 for further processing.

Figure 3:
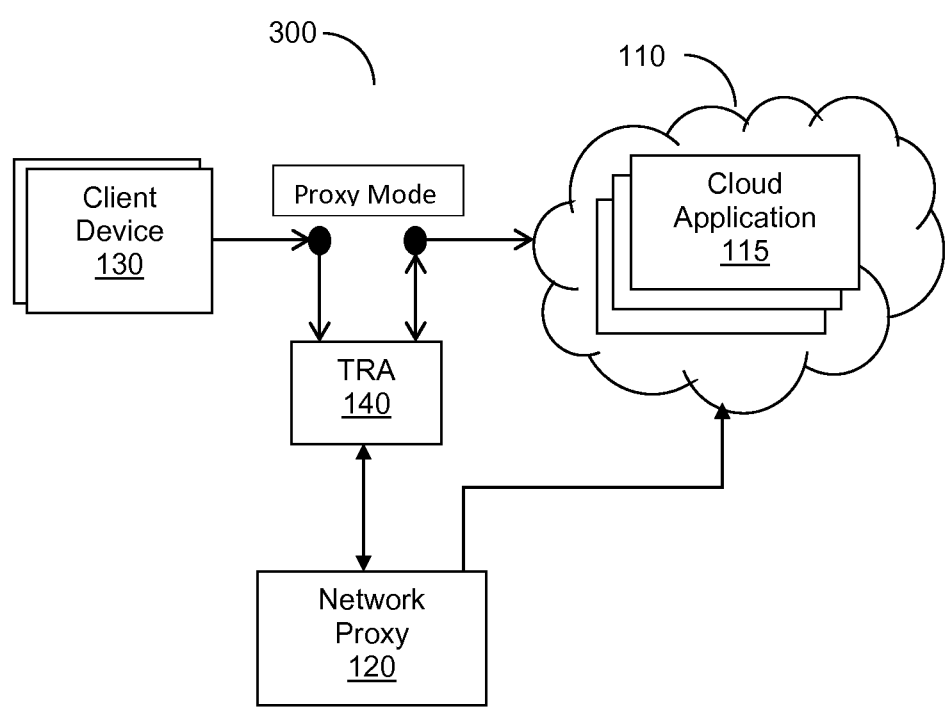
FIG. 3 is a diagram illustrating the deployment of the TRA in a tap mode according to an embodiment.

In the proxy mode of operation, as shown in FIG. 3, the TRA 140 is the end-point receiver of the traffic (requests) sent from the client devices 130. The traffic is reconstructed and sent for later processing by the managed network proxy 120. The managed network proxy 120 is configured to perform certain functions on the received requests and/or reconstructed traffic, such as, but not limited to, modifying requests, blocking requests, generating alerts, and so on. For example, the managed network proxy 120 can utilize vendor APIs to perform prevention for client devices 130 for suspicious activities. In this deployment, the TRA 140 is configured to relay traffic (processed or unprocessed by the managed network proxy 120) to the cloud computing platform 110.

In both deployments the TRA 140 is configured to process decrypted and encrypted traffic. In the former case, the TRA 140 is installed typically after a load balancer (not shown) where the encrypted traffic is decrypted by a different entity (e.g., a load balancer).

In the case of receiving encrypted traffic, the TRA 140 is configured to maintain a copy of a private key. The encrypted traffic is decrypted using the private key of the provider's certificate. This is performed for both the proxy and tap modes.

It should be understood that the embodiments disclosed herein are not limited to the specific architectures illustrated in FIGS. 1-3 and other architectures may be equally used without departing from the scope of the disclosed embodiments. Specifically, the TRA 140 may reside in the cloud computing platform 110, a different cloud computing platform, or a connectable datacenter. Moreover, in an embodiment, there may be a plurality of TRA 140 operating as described hereinabove and configured to either have one as a standby appliance to take control in a case of failure, or to share the load between them, or to split the functions between them. Furthermore, without departing from the scope of the disclosed embodiments, various functions of the TRA 140 may be implemented by the managed network proxy 120.

Figure 4:
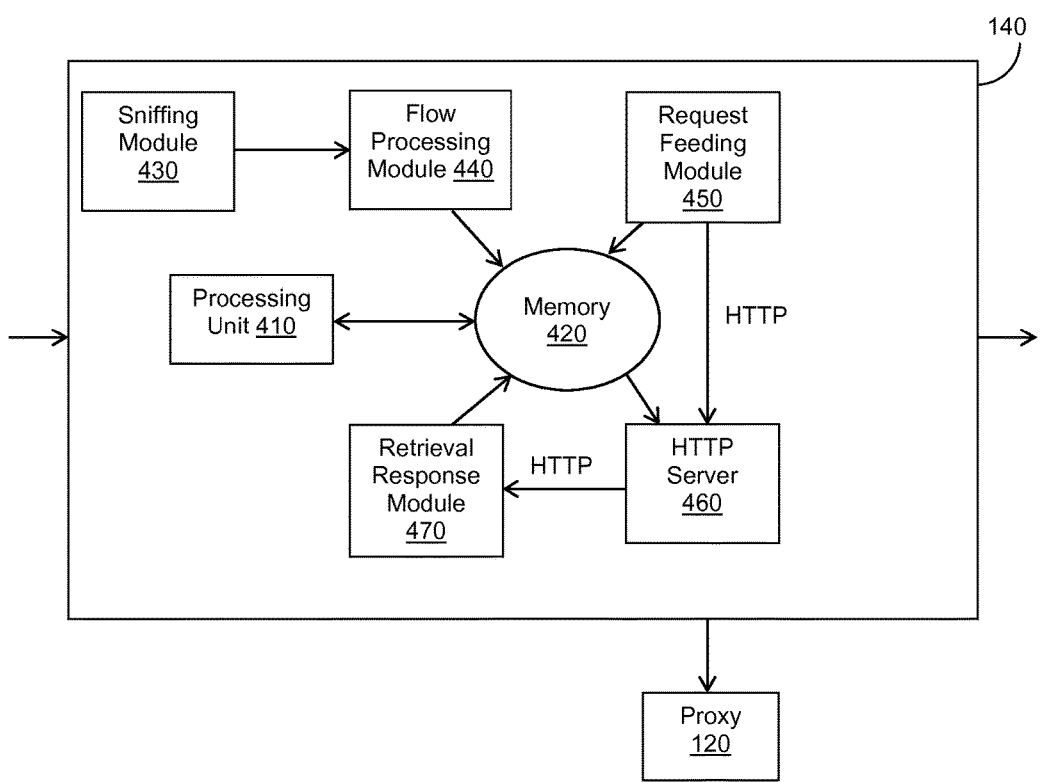
FIG. 4 is a block diagram of the TRA implemented according to one embodiment.

FIG. 4 shows an exemplary and non-limiting block diagram of the TRA 140 implemented according to one embodiment. The TRA 140 includes a processing system 410, a memory 420, a sniffing model 430, a flow processing module 440, a request feeding module 450, a HTTP server 460, and a response retrieval module 470. In certain configurations, the processing system 410 is configured to execute an operating system including, but not limited to, a Linux® OS. The processing system 410 may operate as a packet processor for the TRA 140. Various possible implementations for the processing system 410 are described below.

The memory 440 is shared between all the modules 440 through 470. The memory 440 can be a shared memory section of the file system and/or operating system's kernel. The memory 440 may be realized as, for example, a volatile memory such as a random access memory (RAM), or a non-volatile memory (NVM), such as Flash memory.

In an embodiment, the sniffing module 430 is configured to receive and handle traffic at a high bit rate (e.g., 10 Gbps). The traffic is transported using the HTTP/1.1 protocol in which multiple requests (from client devices 130, FIG. 1) are received on multiple sessions. In an embodiment, the sniffing module 430 is configured to read packets directly from a kernel space of the operation system. This can be achieved using, for example, a "PACKET_MMAP" feature available in a Linux® kernel. The sniffing module 430 is further configured to distribute the read packets to the flow processing module 440 using a zero-copy queue (libshared). This allows for accelerating the packets distribution as no copying of packets is required.

In an embodiment, the flow processing module 440 is configured to run a different process for each session. Therefore, in order to send packets belonging to the same session to the same process, the sniffing module 430 is configured to distribute packets to the respective process executed by the flow processing module 440 by using a unified distribution function. In an embodiment, such a function computes a hash on one or more TCP/IP parameters. The distribution function further creates an even spread of the packets.

In some embodiments, the sniffing module 430 can be implemented on a single network interface card (NIC). In such embodiments, the sniffing module 430 is configured to extract an arbitrary portion of, up to all, the packets from the network card before the packets are lost. Further, to enable high-capacity bandwidth sniffing, the network card including the sniffing module 430 can be configured to support high-performance capturing of frames. In some embodiments, the source code of the network card driver can be modified and its settings changed to, for example, remove unnecessary features that create additional processing at the network card and in the kernel; modify parameters such as ring size to allow for better buffering of packets and avoid loss at the network card or in the kernel; modify firmware parameters, such as offload configuration (processing at the hardware instead of the software); and modify interrupt mapping to support multithreaded sessions, including reduction of interrupt affinity to adapt to the traffic reconstruction. In certain configurations, the sniffing module 430 can be implemented on a network card memory and filter out packets from certain ports (e.g., port 80 or port 443).

In an embodiment, the flow processing module 440 is configured to read packets provided by the sniffing module 430, for example, from one or more zero-copy queues maintained by the sniffing module 430. The flow processing module 440 is further configured to analyze the packets in order to identify TCP sessions that the packets belong to. In an exemplary embodiment, such identification may be performed by an IP-tuple of the session, the sequence number of the SYN (client-side), and/or SYN-ACK (server-side) packets sent when the session was initiated. An IP-tuple includes any combination of source IP address, destination IP address, source port number, and destination port number.

Upon identification of the TCP sessions, the session is reconstructed into a window with a configurable size. In an exemplary and non-limiting embodiment, the default window size is 8 MB. During the reconstruction of a session, packets are identified as either requests or responses and marked as identified requests/responses with an identifier. Such an identifier includes the IP-tuple, a sequence number associated with the respective packet, and a time stamp.

Each marked request and response is written to an output queue, buffer, or file (not shown) maintained in the shared memory 420. It should be noted that a single session may contain more than requests/responses, thus the flow processing module 440 is further configured to enumerate, number, or otherwise index each request/response of a session.

In some embodiments, the output of the flow processing module 440 is stored in directories in a file system. In an exemplary and non-limiting embodiment, two directories can be used: one for requests and one for responses. Each directory can contain a sub-directory per identified TCP session that maintains two files per request/response: one file that contains the session data, and another file that contains the session metadata. The metadata may include, for example, the session size, and the offsets of "holes" in the data caused by packet loss.

In certain embodiments, the files storing requests and responses can be indexed based on the requests/responses per session. As a non-limiting example, indexes may be '8' for the 9th request/response file, '8.metadata' for the 9th request/response metadata file. When a TCP session ends (by a FIN or RST packet or a configurable timeout), an empty file is created to mark that the session has ended. The file name may be indicative of the end of the session, e.g., 'end_mark.metadata'. It should be noted that the files utilized to store the requests, responses, and sessions information are saved in the shared memory 420 in a memory section allocated to the file system.

In an embodiment, the flow processing module 440 is further configured to filter out HTTP requests and responses by utilizing regular expressions on the HTTP requests' header or request line (URI). In an embodiment, the filtered requests and/or responses are not written to an output of the flow processing module 440. This is performed in order to reduce the processing of the requests/responses that do not include any meaningful contents to the managed network proxy 120.

In an embodiment, the flow processing module 440 is configured to perform the TCP session reconstruction on the session window in a way that a packet is placed in the offset that its sequence represents. In certain cases, not all packets belonging to a session (e.g., dropped packets) are provided to the flow processing module 440, thus creating a "hole" in a reconstructed session. According to certain embodiments, the flow processing module 440 is configured to identify such dropped packets or holds, for example, by identifying gaps in the sequence numbers or offsets between two packets placed in the session window. In an embodiment, a reconstructed session should include at least one pair of matching requests and responses. Thus, upon identification of a hole in the session, the process of reconstructing the respective session may be halted by the flow processing module 440.

It should be noted that such holes may be ignored when processing the traffic in a higher layer (e.g., application layer 7). When the holes are not ignored, during higher layer processing the pairs of requests and responses corresponding to the holes can be dropped. As an example, such processing may be performed by the HTTP server 460. The decision whether holes should be ignored or not is configurable.

The request feeding module 450 is configured to read the output (e.g., from the file or buffer) of the flow processing module 440 and provide complete pairs of matching requests and corresponding responses. In an embodiment, the request feeding module 450 is configured to perform the following processes: operate a session handler configured to read the outputs (e.g., from a file), match a request to a corresponding response. The matching is performed based on the request/response identifier (e.g., an IP-tuple and a sequence number) and a preconfigured time-interval threshold (e.g., response received after the predefined time-interval threshold cannot be matched).

In addition, the request is read and matched against a whitelist to determine if the request requires additional processing. Filtered requests are saved to an output zero-copy queue to be read by a request file sender process. The request file sender process is configured to read the filtered requests from the session handler, then replay the filtered requests to the HTTP server 460.

The flow processing module 440 and the request feeding module 450 can be configured to utilize file systems operations for output/input. Typically, file system operations can reduce performance even when the data itself is only in the RAM due to kernel space to user space context switching, global file system locks, and other specific file system locks.

In some embodiments, in order to further optimize the reconstruction of traffic, a high-capacity I/O (not shown) is implemented as a user space implementation of a shared memory 420 of the file system. As such, the shared memory 420 can reduce the number of locks, due in part to the assumption that each file can be written by a single process (e.g., a flow processing module 440) and read/deleted by a single process (e.g., the request feeding module 450), and that no file is written and read simultaneously.

Additional optimization can be achieved using a system-call overriding tool ('libweld'). This tool is used to load the high-capacity I/O and overrides file system API calls to allow the sniffing module 430 to use the high-capacity I/O. In addition, file system related operations for specific paths ('mounts') can be overridden.

In an embodiment, the system-call overriding tool is also utilized by the flow processing module 440 and the request feeding module 450. To allow for improved input/output to reconstruction related processes, the 'system-call overriding tool ('libweld') can be configured to override the entire input/output API call stack and replace the stack with lock-free high-performance API alternatives for specific paths. This includes the following communication systems: (1) inter-process communications (IPC) such as pipes, shared memory, etc. and (2) high-performance file system input/output.

To allow for improved input/output to reconstruction related processes, the flow processing module 440 and request feeding module 450 are configured to utilize various extensions of the system-call overriding tool ('libweld') tool. These extensions are referred to hereinafter as 'libshared', 'libnotify', and 'libshmfs' extension modules. In an embodiment, the libshared extension module can be deployed independently or as a 'libweld' extension module. A 'libweld' extension module can be configured to be chained to another extension module. For example, 'libshmfs' can be chained to 'libnotify' so that after a file is created or closed by the 'libshmfs', a call to 'libnotify' occurs.

In an embodiment, the flow processing module 440 is configured to utilize the libshared extension module in order to read packets from the sniffing module 430 and the shared memory 420. The 'libnotify' extension module is used to write to a pipe the file names of the flow processing module 440. The 'libshmfs' extension module is used for writing output files of the flow processing module 440 to the shared memory 420. The request feeding module 450 is also configured to use the 'libshmfs' extension module to read the input files from flow processing module 440 and the response retrieval module 470.

In some embodiments, the HTTP server 460 and response retrieval module 470 are optional modules and are utilized to simulate some functions of the managed network proxy 120. To this end, the HTTP server 460 is configured to analyze a request read from the request file sender and proxy the request to the response retrieval module 470. In an embodiment, upon receiving the request, the response retrieval module 470 is configured to look up the matching response and fetch the matching response from the shared memory 420. For example, the lookup and fetch operations are performed over the files and directories maintaining such responses and requests. The matching response is sent back to the HTTP server 470 for the analysis of the response. In an embodiment, after a request and/or response is/are handled, the relevant files are deleted from shared memory 420 (e.g., from requests and responses directories).

Figure 6:
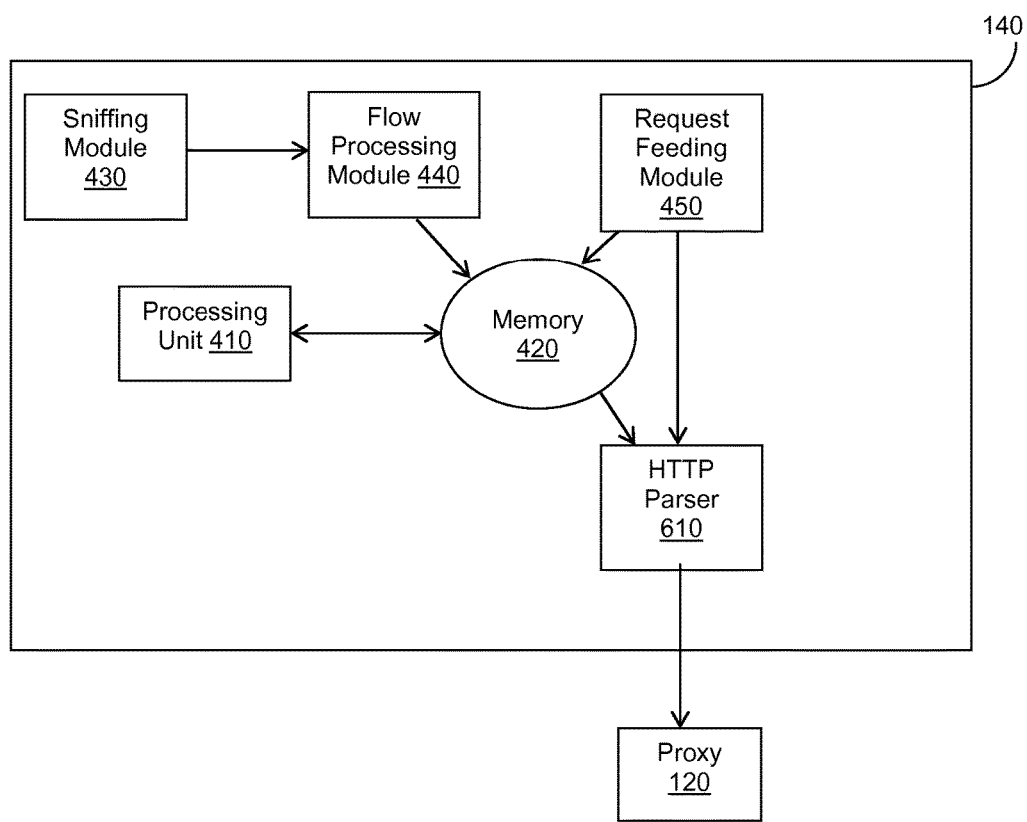
FIG. 6 is a block diagram of the TRA implemented according to another embodiment.

In an embodiment, illustrated in FIG. 6, the TRA 140 includes an HTTP parser 610 to replace the functions performed by the HTTP server 460 and response retrieval module 470. In this embodiment, the request feeding module 450 provides the HTTP parser 610 only with the file names of pairs of requests/responses. This information can be passed, for example, using the 'libshared' extension module.

The HTTP parser 610 is configured to look up and fetch responses (designated by their names) from the shared memory 420. The retrieved responses are parsed by the HTTP parser 610 to detect meaningful attributes required for processing by the managed network proxy 120. The parsing results are sent to the managed network proxy 120. The modules 410, 420, 430, 440, and 450 are discussed in more detail above.

It should be noted that in the operation of the HTTP parser 610 does not require establishment of any HTTP connection to receive requests and responses. Thus, this embodiment provides an accelerated parsing and processing of HTTP responses. It should be further noted that the HTTP parser 610 is also an optional module and the reconstruction of traffic can be performed without the HTTP parser 610.

Some or all the modules discussed with reference to FIG. 4 and FIG. 6, including the processing system 410, can be realized as a processing unit. The processing unit may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing unit may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 410 to perform the various functions described herein.

Figure 5:
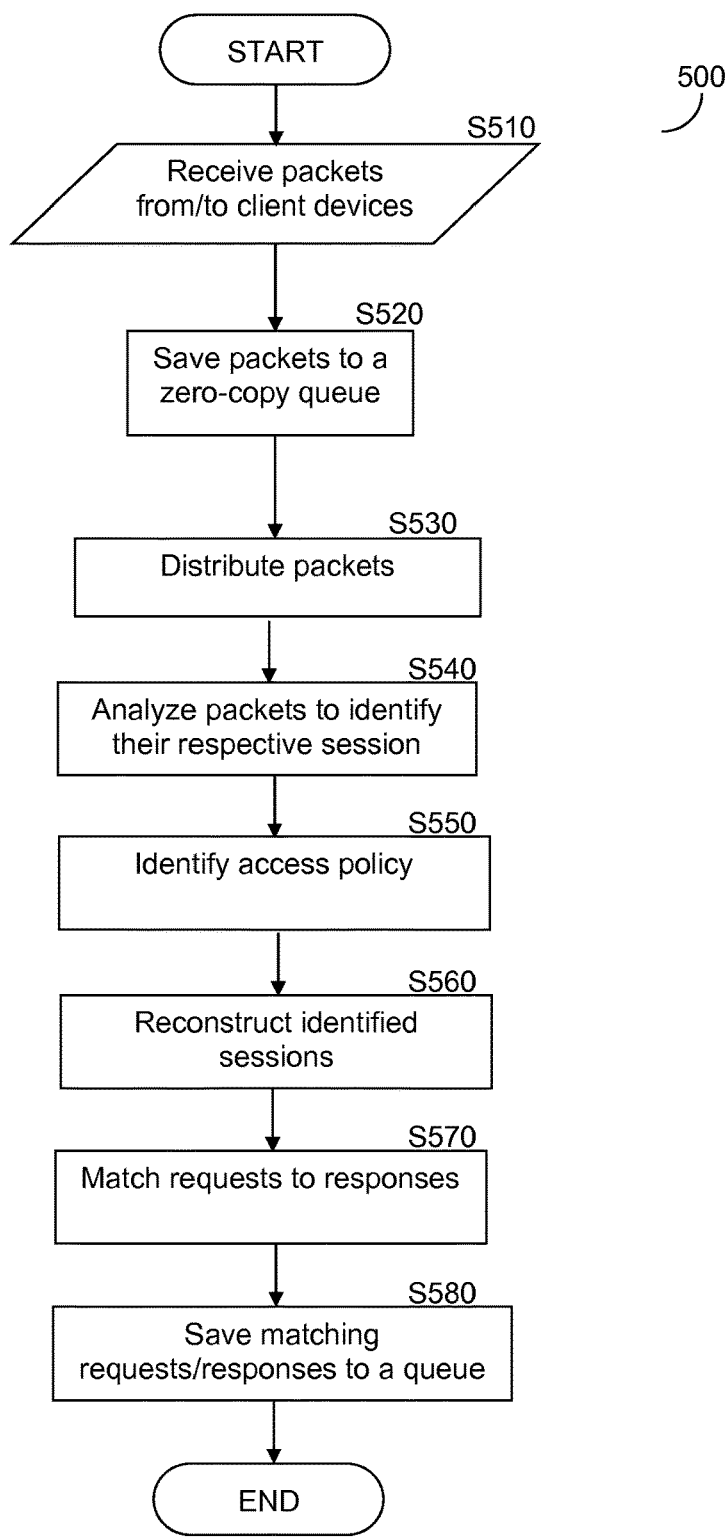
FIG. 5 is a flowchart illustrating the operation of the TRA for reconstructing HTTP traffic according to one embodiment.

FIG. 5 depicts an exemplary and non-limiting flowchart 500 illustrating the operation of the TRA 140 for reconstructing HTTP traffic according to one embodiment.

At S510, packets transported between client devices and servers operable in a cloud computing platform are received. The packets are received independently of the requests and responses. That is, there is no apparent connection between the requests and their corresponding responses in the received packets. At S520, received packets are saved to a zero-copy queue.

In an embodiment, multiple requests/responses can be received in a single session. The reconstruction is performed for each session by an independent process. Accordingly, at S530, packets are distributed to the respective process using a unified distribution function. In an embodiment, such a function computes a hash on one or more TCP/IP parameters. The distribution function further creates an even spread of the packets.

At S540, packets are read form the zero-copy queue and analyzed to identify their respective session. The identification is performed using an IP-tuple of the session, the sequence number of the SYN (client-side), and/or SYN-ACK (server-side) packets sent when the session was initiated. An IP-tuple includes any combination of source IP address, destination IP address, source port number, and destination port number.

At S550, each identified session is reconstructed into a session window with a configurable size. In an embodiment, S550 includes identifying packets as either requests or responses and marking each identified request/response with a matching identifier. The matching identifier may include, for example, the IP-tuple, a sequence number associated with the respective packet, and a time stamp. In addition, as discussed in detail above, the marked requests and responses are written to an output queue(s), buffer(s), file(s), or directories of the file system. In various embodiments, the queue(s), buffer(s), file(s) or directories are maintained in the shared memory 420.

In an embodiment, as part of the session reconstruction process requests and responses are enumerated, numbered, or otherwise indexed in the reconstructed session. In another embodiment, discussed in more detail above, as part of the session reconstruction process holes in the reconstructed session created due to dropped packets are detected.

At S560, the identified requests/responses are read from the output and are matched to each other. The results of S560 are pairs of matching requests and responses. In an embodiment, the matching is performed based on a request/response identifier and a preconfigured time-interval threshold.

At S570, matching requests/responses are saved to the shared memory. Requests having matching responses are matched against a whitelist to determine if the requests require additional processing. In this embodiment, only filtered requests are saved.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for reconstructing application-layer traffic flowing between a plurality of client devices and a cloud computing platform, comprising:
   receiving packets transported between client devices and servers operable in a cloud computing platform;
   saving the received packets to a zero-copy queue, wherein the zero-copy queue is configured for storing the packets in a shared memory for subsequent processing;
   analyzing the packets saved in the zero-copy memory to identify their respective at least one session;
   reconstructing each of the at least one identified session into a session window having a configurable size, wherein a reconstructed session includes application-layer requests and application-layer responses to and from a plurality of cloud-based applications hosted on the servers; and
   for each of the at least one identified session, matching each application-layer request to a corresponding application-layer response based on a matching identifier and a time-interval threshold to result with the reconstructed application-layer traffic.

2. The method of claim 1, further comprising:
   sending each application-layer request to an application-layer server;
   receiving a corresponding application-layer response in response to the request provided by the application-layer server.

3. The method of claim 2, further comprising:
   receiving pairs matching application-layer requests and application-layer responses designated by file names of the pairs;
   retrieving the designated application-layer responses from the shared memory; and
   parsing contents of each of the retrieved designated application-layer responses.

4. The method of claim 1, wherein a plurality of application-layer requests and application-layer responses are received in a single session.

5. The method of claim 4, wherein reconstructing each of the at least one identified session is performed by an independent reconstruction process.

6. The method of claim 5, further comprising:
   distributing the received packets to the independent reconstruction process using a unified distribution function.

7. The method of claim 1, wherein identification of the at least one session is based on at least one of: an IP-tuple of the at least one session, a sequence number of a SYN packet, and a SYN-ACK packet sent when the session was initiated.

8. The method of claim 1, wherein reconstructing each of the at least one identified session further comprises:
   identifying packets as either application-layer requests or application-layer responses;
   marking each identified application-layer request and application-layer response with a matching identifier;
   writing the marked application-layer requests and application-layer responses to any one of: an output queue, an output buffer, an output file, and an output directory of a file system.

9. The method of claim 8, further comprising:
   enumerating the requests and responses in the reconstructed session.

10. The method of claim 8, further comprising:
    detecting holes in the reconstructed session created due to dropped packets.

11. The method of claim 8, wherein any one of the output queue, the output buffer, the output file, and the output directory are part of the shared memory.

12. The method of claim 1, wherein matching application-layer requests to application-layer corresponding responses further comprises:
    filtering application-layer requests based on a whitelist; and
    saving application-layer filtered responses to the shared memory.

13. The method of claim 1, wherein the application-layer traffic including the application-layer requests and responses is transported using a hypertext transfer protocol 1.1 (HTTP/1.1).

14. The method of claim 1, wherein the method operates in a proxy mode where the application-layer traffic is not relayed to the cloud-computing platform.

15. The method of claim 1, wherein the method operates in a tap mode where the application-layer traffic is relayed to the cloud-computing platform.

16. The method of claim 1, wherein the matching identifier includes at least matching an IP-tuple, a sequence number associated with the respective packet, and a time stamp.

17. A non-transitory computer readable medium having stored thereon instructions for causing one or more processing units to execute the method according to claim 1.

18. An appliance for reconstructing application-layer traffic flowing between a plurality of client devices and a cloud computing platform, comprising:
a network interface card configured to receive packets transported between client devices and servers operable in a cloud computing platform, wherein the network interface card is further configured to save the received packets to a zero-copy queue, wherein the zero-copy queue is configured for storing the packets in a shared memory for subsequent processing;
a flow processor configured to analyze the packets saved in the zero-copy memory to identify their respective at least one session, wherein the flow processor is further configured to reconstruct each of the at least one identified session into a session window having a configurable size, wherein a reconstructed session includes application-layer requests and application-layer responses to and from a plurality of cloud-based applications hosted on the servers; and
a request feeding processor configured to match, for each of the identified sessions, each request to a corresponding response based on a matching identifier and a time-interval threshold to result with the reconstructed application-layer traffic.

19. The appliance of claim 18, further comprising:
an application-layer server; and
a response retrieval processor configured to retrieve a corresponding response in response to the request provided by the application-layer server.

20. The appliance of claim 18, further comprising:
an application-layer parser configured to:
receive pairs matching requests and responses designated by file names of the pairs;
retrieve the designated responses from the shared memory; and
parse contents of each of the retrieved responses.

21. A system for reconstructing application-layer traffic flowing between a plurality of client devices and a cloud computing platform, comprising:
a processor; and
a shared memory, the memory containing instructions that, when executed by the processor, configure the system to:
receive packets transported between client devices and servers operable in a cloud computing platform;
save the received packets to a zero-copy queue, wherein the zero-copy queue is configured for storing the packets in the shared memory for subsequent processing;
analyze the packets saved in the zero-copy memory to identify their respective at least one session;
reconstruct each of the at least one identified session into a session window having a configurable size, wherein a reconstructed session includes application-layer requests and application-layer responses to and from a plurality of cloud-based applications hosted on the servers; and
for each of the identified session, match each application-layer request to a corresponding application-layer response based on a matching identifier and a time-interval threshold to result with the reconstructed application-layer traffic.

22. The system of claim 21, wherein the system is further configured to:
send each application-layer request to an application-layer server;
receive a corresponding application-layer response in response to the request provided by the application-layer server.

23. The system of claim 22, wherein the system is further configured to:
receive pairs matching application-layer requests and application-layer responses designated by file names of the pairs;
retrieve the designated application-layer responses from the shared memory; and
parse contents of each of the retrieved designated application-layer responses.

24. The system of claim 21, wherein a plurality of application-layer requests and application-layer responses are received in a single session.

25. The system of claim 24, wherein reconstructing each of the at least one identified sessions is performed by an independent reconstruction process.

26. The system of claim 25, wherein the system is further configured to:
distribute the received packets to the independent reconstruction process using a unified distribution function.

27. The system of claim 21, wherein identification of the at least one session is based on at least one of: an IP-tuple of the at least one session, a sequence number of a SYN packet, and a SYN-ACK packet sent when the session was initiated.

28. The system of claim 21, wherein the system is further configured to:
identify packets as either application-layer requests or application-layer responses;
mark each identified application-layer request and application-layer response with a matching identifier;
write the marked application-layer requests and application-layer responses to any one of: an output queue, an output buffer, an output file, and an output directory of a file system.

29. The system of claim 28, wherein the system is further configured to:
enumerate application-layer requests and application-layer responses in the reconstructed session.

30. The system of claim 28, wherein the system is further configured to:
detect holes in the reconstructed session created due to dropped packets.

31. The system of claim 28, wherein any one of the output queue, the output buffer, the output file, and the output directory are part of the shared memory.

32. The system of claim 21, wherein the system is further configured to:
filter requests based on a whitelist; and
save filtered responses to the shared memory.

33. The system of claim 21, wherein the application-layer traffic is transported using a hypertext transfer protocol 1.1 (HTTP/1.1).

34. The system of claim 21, wherein the system is configured to operate in a proxy mode where the application-layer traffic is not relayed to the cloud-computing platform.

35. The system of claim 21, wherein the system is configured to operate in a tap mode where the application-layer traffic is relayed to the cloud-computing platform.

36. The system of claim 21, wherein the matching identifier includes at least matching an IP-tuple, a sequence number associated with the respective packet, and a time stamp.

* * * * *